Nov. 4, 1958 E. GUNDERT ET AL 2,859,378

ELECTRODE SYSTEM FOR CATHODE RAY TUBES

Filed May 21, 1956 2 Sheets-Sheet 1

INVENTORS:
EBERHARD GUNDERT,
GERWIG VIBRANS,

BY Nathan J. Lomfeld
THEIR ATTORNEY.

ELECTRODE SYSTEM FOR CATHODE RAY TUBES

Filed May 21, 1956 2 Sheets-Sheet 2

INVENTORS:
EBERHARD GUNDERT,
GERWIG VIBRANS,
BY Nathan J. Kornfeld
THEIR ATTORNEY.

2,859,378

ELECTRODE SYSTEM FOR CATHODE RAY TUBES

Eberhard Gundert, Ulm (Danube), and Gerwig Vibrans, Neu-Ulm-Ludwigsfeld, Germany, assignors to General Electric Company, a corporation of New York Application May 21, 1956, Serial No. 586,291

17 Claims. (Cl. 315—13)

The invention relates to systems for controlling electron beams in multiple beam cathode ray tubes and more particularly to electrode systems for focusing and converging the electron beams of a tri-beam type cathode ray tube.

Cathode ray tubes having three electron guns are used as color television picture tubes. To obtain a picture with good color purity, each of the beams must be focused to a slender sharply defined beam and the three beams must be caused to impinge at approximately the same point on the screen of the picture tube. For reasons relating to the better operation of a picture tube, an embodiment of the tube having three beam providing means disposed in a horizontal co-planar arrangement has been selected. Thus, in order to cause the beams to impinge at a predetermined point, the beams must converge in the horizontal plane and must, in addition, be aligned in a vertical direction.

Accordingly, it is a principal object of the invention to provide means for aligning a plurality of electron beams and converging said beams onto the screen of a cathode ray tube.

For single-beam type cathode ray tubes, the use of a number of electrically conducting plates mounted in closely spaced parallel relation as lens electrodes for focusing the electron beam has been suggested. Each such plate is provided with an aperture, and the group of apertures thus provided is aligned for permitting the passage of the electron beam and have suitable potential connections in order to act as electrostatic lenses.

It is another object of the invention to provide an electrode system for focusing a plurality of beams in a cathode ray tube.

Further, co-planar lens systems heretofore used for the electron guns of cathode ray tubes have had the defect that the beam generated by the center gun is especially susceptible to aberrations, due primarily to the non-circular field distribution produced by the plates.

It is therefore another object of the invention to provide a lens system for sharper focusing of electron beams.

In the attainment of the foregoing objects, I provide an electrode system, suitably energized, for a multiple beam cathode ray tube comprising a plurality of spaced parallel plates disposed in planes perpendicular to the principal direction of travel of the beams and having apertures therein corresponding to the number of beams for permitting the passage of said beams therethrough, and to thereby produce a focusing action on said beams. Further, said electrode system includes means for aligning and converging the multiple beams, said means comprising a plurality of plates vertically disposed such as to straddle said beams. Said plates being adapted to be energized both electrostatically and electromagnetically such as to deflect the electron beams in mutually perpendicular directions.

In accordance with one feature of the invention, various electrodes are used in common by the plurality of beams. This provides a substantial advantage in that economy and ease of construction are thereby achieved. In particular, the electrodes employed in common affect the beams in a predetermined uniform manner as well as requiring a minimum of physical space in the neck of the already crowded picture tube.

Other objects and advantages will become apparent after a consideration of the specification and the drawings in which:

Figure 8 is an enlarged cross section view taken along lines 8—8 of Figure 7 showing the aligning and converging plates.

Figures 1, 2, 3, 5, 6:
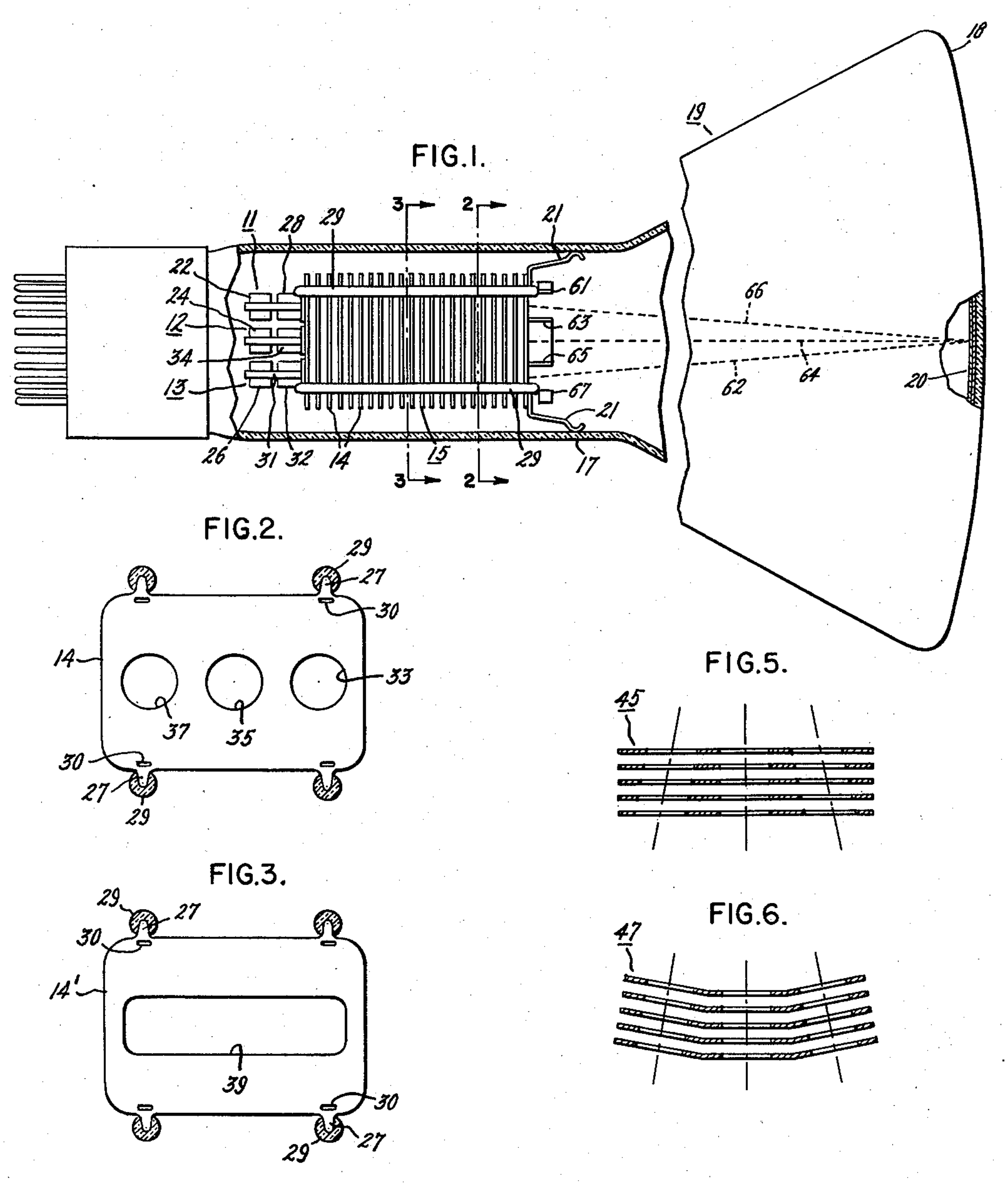
Figure 1 is a plan view of a cathode ray tube having an electrode system in accordance with the invention.
Figure 2 is an enlarged cross sectional view taken along the lines 2—2 of Figure 1 to show an elevational view of one of the outer focusing plates.
Figure 3 is an enlarged cross sectional view taken along the lines 3—3 of Figure 1 to show an elevational view of one of the center focusing plates.
Figure 5 is an enlarged plan view of a second alternative embodiment of the plates of Figure 1.
Figure 6 is another enlarged plan view of alternative embodiments of the plates of Figure 1.

In Figure 1 there is shown three electron gun units 11, 12 and 13 disposed in co-planar relation; each unit consists of the usual cathodes (not shown), control electrodes 22, 24 and 26, and first accelerating anodes 28, 32 and 34, and a plurality of individual electrically conducting plates 14 constituting the lens electrode system 15 are mounted in neck 17 of a color television picture tube 19. Television tube 19 includes a viewing area 18 having a luminescent surface including a conducting surface 20 disposed thereon. The electrical connections are not shown in Figure 1, but are shown in Figure 8. One end of the lens system 15 may be maintained in position by spring clips 21 and the other end of the unit may be conventionally supported by the various voltage lead supports extending to any suitable vacuum seal, not shown.

The lens system comprises a plurality of individual electrically-conducting plates 14 mounted in spaced parallel relation and each plate being affixed to the insulating support rods 29. In one embodiment of my invention, the electrode plates are supported by four insulating rods 29 mounted parallel to the axis of the tube and made, for example, of glass, and into which mounting lugs 27 of the individual plates 14 may be inserted and sealed, the details of which are more clearly shown in Figures 2 and 3. The plate closest to the viewing surface may be fastened to clips 21 at diametrically opposite points. The opposite end plate of system 15 may be affixed to the units 11, 12 and 13 as by spot welding. The various electrodes of units 11, 12 and 13 are maintained in predetermined position by means of insulating rods 31. For efficiency in construction, the electrodes in each of the guns may be initially aligned with each other and affixed to rods 31, and then affixed to the end plate of the lens system 15.

Figure 2 shows one of the outer group of plates 14 of the lens system 15. To correspond to the three beam arrangement, each of the plates has three apertures 33, 35 and 37; each of the apertures being coaxially aligned with the respective beams. Lugs 27 of plates 14 may be provided with small openings 30 to permit the expansion of the plates when the electrode system is heated and thereby to prevent cracking of the mounting rods 29.

To eliminate aberrations in the lens system, some of the plate apertures are made in a shape other than round in such a way that the resulting changes in the field will have a compensating effect for the aberration phenomena on the center beam. Thus, for example, the aberrations of the middle beam, which as mentioned previously are most pronounced, may be eliminated by designing the plates in the center of the lens electrode system as a toroidal lens. For this purpose, the center group of plates 14' of system 15 have apertures 39 formed therein in an elongated or rectangular shape, Figure 3. Aperture 39, may for example have a width equal to the diameter of the openings and a length limited by the two outside apertures. In one practical embodiment, twenty-one plates are employed, sixteen plates have round apertures and the center five plates have elongated apertures, the diameter of the circular apertures is 350 mils, and the spacing between the plates is 20 mils. Dimensions of rectangular opening 39 is, as shown, such that the length is equal to the overall distance between the external diametrical points of apertures 33 and 37 and the width is equal to the diameter of the said apertures.

Figure 4:
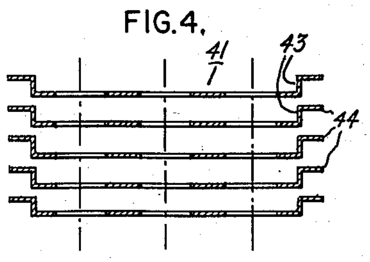
Figure 4 is an enlarged elevational view of an alternative embodiment of the plates of Figure 1.

The above-mentioned aberrations may also be greatly reduced or eliminated by fabricating the electrically-conducting plates 41 in the alternative embodiment as shown in Figure 4. In this arrangement, the periphery of the plates 41 have flanges 43 at right angles to the plane of the plate 41. The flange 43 is of such length as to reach closely to the next plate, without touching said plates. In one embodiment, the spacing between the flanges 43 and the plates is approximately 5 mils. The effect of the flanges is to shield the space between the plates from external fields. Plates 41 may be fastened to the insulating rods by lugs, not shown, on flange 44, such lugs being parallel to the plane of the plate or by lugs (not shown) on the flange 43 itself.

Figures 5 and 6 show schematically two modifications of the electrically-conducting plates 45 and 47 respectively, forming a lens system, and in which the outer apertures of the individual plates are so staggered that the electron beam generated by the outer systems will meet the screen at the same point as the middle beam. For purposes of the drawing, the angle of convergence is exaggerated. In the modification shown in Figure 5, the plates are co-planar and maintained in parallel relation and the axes of outer apertures in the plates are progressively converged toward the center. The axes of the electron guns are aligned in corresponding relation to the axes of the apertures. In the modification shown in Figure 6, the apertures are also progressively converged and in addition, the plates are bent so as to provide a more nearly normal surface to each of the beams to further minimize aberrations.

Figure 7:
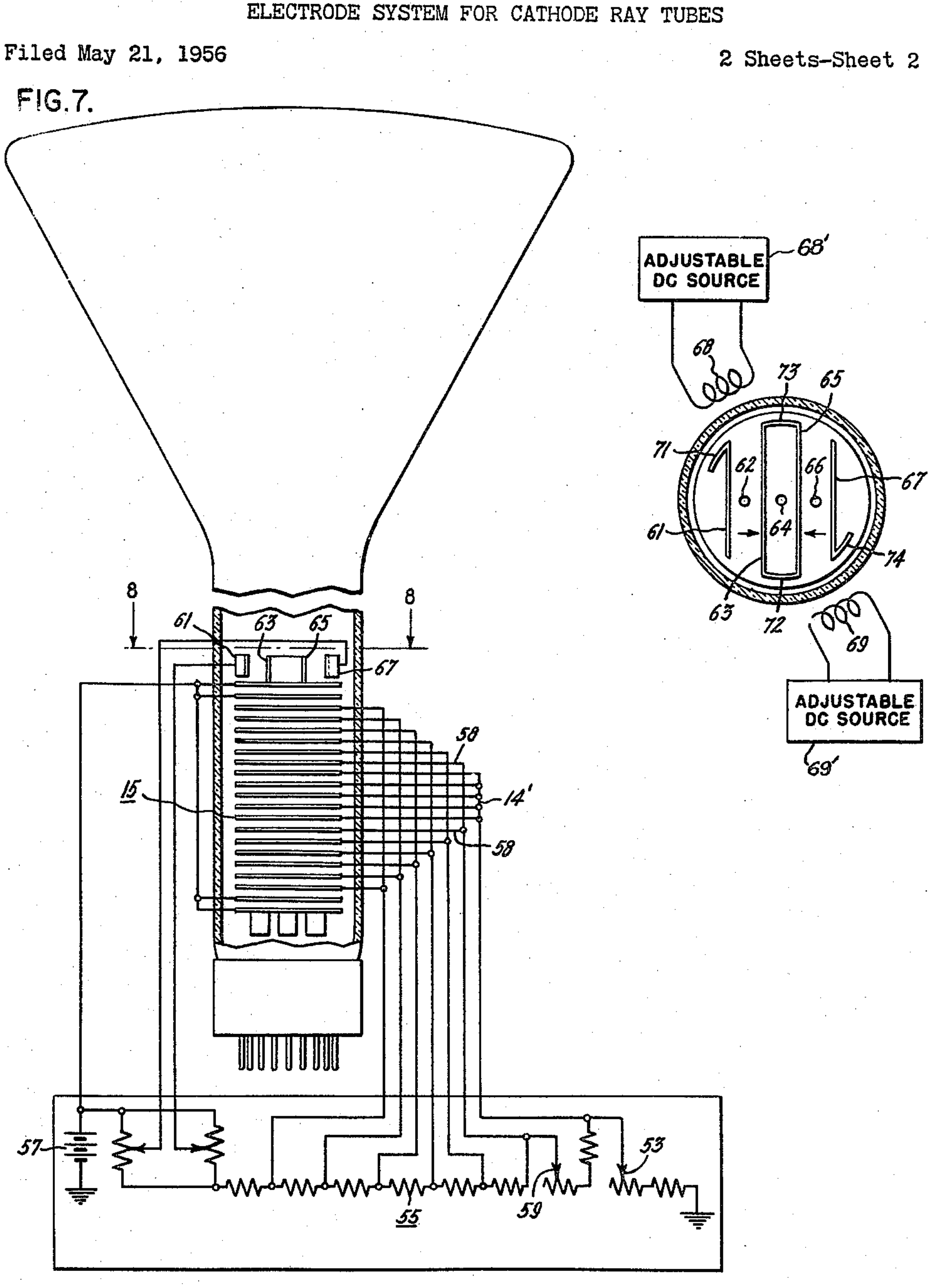
Figure 7 is a plan view of a cathode ray tube according to my invention showing the electrical connections.

Figure 7 shows an electrical circuit for energizing the electrode system of the invention. A relatively wide focusing region having a decreasing voltage potential toward the center portion thereof and having a low potential in the center of the lens systems is provided. Such a focusing region will provide the benefits inherent in a thick electron lens as well as effectively shifting the center of the lens system forward which is desirable in order to reduce the magnification of the cross section of the beam. About one-third of the total number of the plates 14' mounted in the center of the lens system 15 are coupled through the same adjustable contact 53 of voltage divider 55 to source 57. The plates on either side of the center group of plates are connected to higher potentials through adjustable contact 59. The voltage divider 55 is connected, as shown, to the plates of the lens system 15 such that when the potential applied to the center plates 14' changes as by changing the position of contact 53, the potentials of the outer plates are changed in the same direction. In order to enable the potential of the plates 58 mounted directly on either side of the center plates 14' to be varied independently, which is recommended for the purpose of a better compensation for aberrations, plates 58 are connected to potentiometer 55 through variable contacts 59. The remaining plates 14 progressing from the center toward both ends of system 15 are connected to voltage divider 55 at successively higher voltage points such as to obtain coresponding changes of voltage from the center in either direction. By means of this circuit arrangement, the optimum potential distribution may be obtained in the lens system with the highest accuracy.

As a result of the field configurations produced in the lens system by the suitably energized plates, each of the three beams is caused to be focused into a slender sharply defined beam.

After the electron beams emerge from the lens system it is necessary to provide means to cause the three beams 62, 64 and 66 to impinge at approximately the same point on the screen. For this purpose plates 61, 63, 65 and 67 made of ferromagnetic material approximately 0.01 inch thick are disposed straddling the three beams, as shown more clearly in enlarged cross sectional view, Figure 8. In one embodiment, plates 61, and 67 are approximately 0.5 inch in height and 0.40 inch in width, and plates 63 and 65 are approximately 0.60 inch in height and 0.40 inch in width. Height is taken as the dimension normal to the axis of the tube, and width is taken as the dimension parallel to the axis of the tube. Plates 61, 63, 65 and 67 are provided with shoe-pole-type extensions 71, 72, 73 and 74 respectively, which extensions provide a more efficient coupling means to coils 68 and 69 which are energized by external sources 68' and 69' to provide magneto motive forces. In one embodiment, the shoe-pole-type extensions are approximately 0.20 inch in length and of the same width as the plates. Sources 68' and 69' provide a direct current adjustable in direction and magnitude to coils 68 and 69 respectively.

The direction of current in energized coil 68 determines the polarity of the pole-shoe extensions 71 and 73 and thus of the plates 61 and 63 and is adjustable in magnitude and direction to develop magnetic field lines of force between the plates 61 and 63 in a direction so as to cause the beam 62 to move up or down as required. Coil 69 is similar to coil 68 and preferably operates independently of coil 68 so that each of the beams 62 and 66 can be positioned independently. The inner plates 63 and 65 are magnetically short-circuited and provide a shield for the center beam so as to prevent the field developed by coils 68 and 69 from affecting the center beam.

The inner plates 63 and 65 are affixed to the last plate of the lens electrode system, Figure 7, and the voltage required for the electrostatic deflection of the beam may be obtained from the same source 57 as that supplying the lens system 15.

By means of electrostatic and electromagnetic fields developed between these plates, the two outer electron beams are caused to converge toward the center beam and concurrently the beams are aligned in a horizontal plane. From Figures 7 and 8 it can be seen that the plates 61 and 67 have the same potential applied thereto, and that plates 63 and 65 are electrically coupled. Concurrently with the application of a voltage to the plates a magnetic field produced by coils 68 and 69, mounted external to the neck of the tube, may be applied between plates 61—63 and 65—67. The deflection voltage applied to plates 63 and 65 induces electric lines of force at right angles to the plane of the plates, which lines deflect the beams in the direction of these lines of force, and in this case tend to converge the outer beam 62 and 66 toward the center beam 64. The magnetic field lines of force existing between plates 61 and 63 and between 65 and 67 are parallel to the electric lines of force, and due to the phenomena associated with magnetic fields, the magnetic field deflects the beams in a direction perpendicular to said lines of force and thus can be used to align the beams in a horizontal plane.

An advantage of this construction is that the deflection systems occupy very little space within the tube, and the necessity for enlarging the neck of the tube is eliminated.

While specific examples have been given in describing details of this invention, it will be understood that they have been given merely by way of illustration and that the invention is not limited thereto.

What we claim as new and desire to secure by Letters Patent of the United States is:

1. A multiple beam cathode ray tube comprising an envelope, a viewing area having luminescent elements disposed thereon, means directing a plurality of electron beams toward said viewing area, electrostatic lens common to said beams focusing said beams into sharply defined beams, said lens means comprising a plurality of spaced parallel plates mounted transverse to said beams and having apertures therein adapted to provide focusing effects to said beams, beam deflecting means for aligning said beams in co-planar relation and for converging said beams, said deflecting means comprising plates disposed adjacent said beams and energized such as to provide both electrostatic and electromagnetic fields therebetween, said fields deflecting said beams in mutually perpendicular directions.

2. A multiple beam cathode ray tube comprising an envelope, a viewing area having luminescent elements disposed thereon, means directing a plurality of electron beams toward said viewing area, electrostatic lens means common to said beams for focusing said beams, said lens means comprising a plurality of spaced parallel plates suitably energized mounted transverse to said beams and having apertures therein adapted to provide focusing effects to said beams, deflecting means adapted to converge said beams toward a common point on said viewing area and to align said beams in co-planar relation, said deflecting means comprising plates disposed to straddle each of said beams, said plates being energized such as to provide both electrostatic and electromagnetic fields therebetween, said fields deflecting said beams in mutually perpendicular direction for directing said beams toward a common point and the center plates of said deflecting means being electrically coupled to each other and to at least one of the outer plates of said lens means.

3. A multiple beam cathode ray tube comprising an envelope, a viewing area having luminescent elements disposed thereon, means directing a plurality of electron beams toward said viewing area, electrostatic lens means common to said beams focusing said beams, said lens means comprising a plurality of spaced parallel plates suitably energized mounted transverse to said beams and having apertures therein adapted to provide focusing effects to said beams, deflecting means adapted to deflect said beams toward a common point on said viewing area and to align said beams in co-planar relation, said deflecting means comprising plates disposed to straddle said beams and being energized such as to provide both electrostatic and electromagnetic fields therebetween, said fields deflecting said beams in mutually perpendicular direction for converging said beams toward a common point, said plates of said lens means having the center group of plates thereof coupled to the same voltage potential, successive plates to either side of said center group of plates being coupled to higher potentials in stepped relation.

4. A multiple beam cathode ray tube comprising an envelope, a viewing area having luminescent elements disposed thereon, means for directing a plurality of electron beams toward said viewing area, electrode lens means common to said beams focusing said beams, said lens means comprising a plurality of spaced parallel plates mounted transverse to said beams and having apertures therein adapted to provide focusing effects to said beams, deflecting means adapted to deflect said beams toward a common point on said viewing area and to align said beams in co-planar relation, said deflecting means comprising plates disposed to straddle each of said beams and being energized such as to provide both electrostatic and electromagnetic fields therebetween, and said fields deflecting said beams in mutually perpendicular direction for converging said beams toward a common point.

5. In a multiple beam cathode ray tube, an electrode lens system for focusing the electron beams of said cathode ray tube, said electrode lens system comprising a plurality of closely spaced electrically conducting plates mounted transverse to said beams, said plates having apertures, each of said apertures being coaxial with one of said beams, and adapted to produce focusing effects on beams passing therethrough, and said plates being common to the multiple beams.

6. In a multiple beam cathode ray tube, a converging and aligning means for said beams comprising a plurality of spaced plates straddling each of said beams, said plates adapted to be energized by both electrostatic and electromagnetic means, the said plates straddling the center one of said beams being electrically and magnetically coupled for electrostatically and electromagnetically shielding said center beam.

7. In a multiple beam cathode ray tube, an electrode lens system for focusing the electron beams of said cathode ray tube, said electrode lens system comprising a plurality of spaced plates mounted transverse to said beams, said plates having apertures coaxial with said beams, said apertures adapted to produce focusing effects on beams passing therethrough, and said plates being common to the multiple beams.

8. A multiple beam cathode ray tube comprising an envelope, a viewing area having luminescent elements disposed thereon, means for directing a plurality of electron beams toward said viewing area, an electrode lens system for focusing said electron beams comprising a plurality of plates mounted transverse to said beams, said plates provided with apertures and adapted to provide a focusing effect on electron beams traversing said apertures, and said plates being common to the multiple beams.

9. In a multiple beam cathode ray tube, an electrode lens system for focusing the electron beams of said cathode ray tube, said electrode lens system comprising a plurality of spaced plates mounted transverse to said beams and provided with apertures adapted to produce focusing effects on beams passing therethrough, mounting rods and said plates having lugs on the periphery thereof and adapted to be inserted and sealed to said rods.

10. In a multiple beam cathode ray tube, an electrode lens system for focusing the electron beams of said cathode ray tube, said electrode lens system comprising a plurality of spaced plates mounted transverse to said beams and provided with apertures adapted to produce focusing effects on beams passing therethrough, mounting rods and said plates having lugs on the periphery thereof and adapted to be inserted and sealed to said rods, said plates having openings adjacent said lugs thereby permitting expansion of said plates without effecting the connection to said rod.

11. In a multiple beam cathode ray tube, an electrode lens system for focusing the electron beams of said cathode ray tube, said electrode lens system comprising a plurality of spaced plates mounted transverse to said beams and provided with apertures adapted to produce focusing effects on beams passing therethrough, said apertures being coaxial with said beams, and the axis of said outer apertures being in converging relation to the axis of said center apertures.

12. In a multiple beam cathode ray tube, an electrode lens system for focusing the electron beams of said cathode ray tube, said electrode lens system comprising a plurality of spaced plates mounted transverse to said beams and provided with apertures adapted to produce focusing effects on beams passing therethrough, said apertures being coaxial with said beams, the axis of said outer apertures being in converging relation to the axis of said center apertures, and each of said plates being bent to provide a surface substantially normal to the axis of said beams.

13. In a multiple beam cathode ray tube, an electrode lens system for focusing the electron beams of said cathode ray tube, said electrode lens system comprising a plurality of spaced plates mounted transverse to said beams and provided with apertures adapted to produce focusing effects on beams passing therethrough, the center group of said plates having an elongated aperture through which said beams pass, the outer group of said plates having circular apertures, each one of said circular apertures being coaxial with the axis of one of said beams.

14. In a multiple beam cathode ray tube, an electrode lens system for focusing the electron beams of said cathode ray tube, said electrode lens system comprising a plurality of spaced plates mounted transverse to said beams and provided with apertures adapted to produce focusing effects on beams passing therethrough, the periphery of said plates including an L-shaped flange at right angles to the plane of the plate.

15. In a multiple electron beam cathode ray tube, an electrode lens system for focusing the electron beams of said cathode ray tube, said electrode lens system comprising a plurality of spaced plates mounted transverse to said beams and provided with apertures adapted to produce focusing effects on beams passing therethrough, each of some of said plates having a common aperture through which said beams pass, and each of the others of said plates having individual apertures through which said beams respectively pass.

16. A multiple beam cathode ray tube comprising an envelope, a viewing area having luminescent elements disposed thereon, means for directing a plurality of electron beams toward said viewing area, an electrode lens system for focusing said electron beams comprising a plurality of plates mounted transverse to said beams, said plates being provided with apertures and being adapted to provide a focusing effect on electron beams traversing said apertures, said plates being common to the multiple beams, means for applying a first potential to a first group of said plates intermediate the ends of said plurality of said plates, and means for applying to plates on both sides of said first group potentials higher than said first potential.

17. In a multiple electron beam cathode ray tube, an electrode lens system for focusing the electron beams of said cathode ray tube, said electrode lens system comprising a plurality of spaced plates mounted transverse to said beams and provided with apertures adapted to produce focusing effects on beams passing therethrough, each plate in a first group of said plates having a common aperture through which said beams pass, and each of the other plates having individual apertures through which said respective beams pass, means for applying a first potential to said plates having a common aperture, and means for applying potentials higher than said first potential to said plates having individual apertures.

References Cited in the file of this patent

UNITED STATES PATENTS

| | | |
|---|---|---|
| 2,225,479 | Jonker | Dec. 17, 1940 |
| 2,457,175 | Parker | Dec. 28, 1948 |
| 2,521,426 | Trump | Sept. 5, 1950 |
| 2,672,574 | Evans | Mar. 16, 1954 |
| 2,679,614 | Friend | May 25, 1954 |
| 2,690,517 | Nicoll | Sept. 28, 1954 |